(12) United States Patent
Crossman

(10) Patent No.: US 11,532,242 B2
(45) Date of Patent: Dec. 20, 2022

(54) MOTIVATOR: AN ONLINE MOTIVATION SYSTEM FOR LEARNING TEAMS

(71) Applicant: Dale Gene Crossman, Phoenix, AZ (US)

(72) Inventor: Dale Gene Crossman, Phoenix, AZ (US)

( * ) Notice: Subject to any disclaimer, the term of this patent is extended or adjusted under 35 U.S.C. 154(b) by 40 days.

(21) Appl. No.: 16/023,159

(22) Filed: Jun. 29, 2018

(65) Prior Publication Data

US 2020/0005665 A1    Jan. 2, 2020

(51) Int. Cl.
  *G09B 5/10*  (2006.01)
  *G09B 19/00*  (2006.01)
(52) U.S. Cl.
  CPC ................... *G09B 19/00* (2013.01)
(58) Field of Classification Search
  CPC .............................. G09B 1/00; A63F 2250/00
  See application file for complete search history.

(56) References Cited

U.S. PATENT DOCUMENTS

| | | | | |
|---|---|---|---|---|
| 6,760,748 B1* | 7/2004 | Hakim | ..................... | G09B 5/14 434/350 |
| 7,402,105 B1* | 7/2008 | Hutter | ..................... | A63F 13/12 463/42 |
| 2003/0064788 A1* | 4/2003 | Walker | ..................... | G07F 17/32 463/20 |
| 2010/0151431 A1* | 6/2010 | Miller | ...................... | G09B 5/00 434/350 |
| 2013/0029306 A1* | 1/2013 | Pulyassary | ............... | G09B 7/02 434/322 |
| 2017/0018200 A1* | 1/2017 | Nemire | .................... | G09B 7/02 |
| 2017/0032298 A1* | 2/2017 | de Ghellinck | ..... | G06Q 10/0639 |

* cited by examiner

*Primary Examiner* — Sunit Pandya

(57) ABSTRACT

This online motivation system is not a learning method. It enables an educator to deliver an identical virtual reward, called a bonus, to every member of a learning team. The learning team consists of learners and their tutors assembled by the educator for online game play in the reward environment. The educator tasks the learner with goals in the learning environment and tasks the tutor with helping the learner to succeed. When the learner demonstrates satisfactory progress in the learning environment, every learning team member receives the virtual bonus in the reward environment. When the educator notifies the system of unsatisfactory progress by the learner, the system communicates penalty imposition while removing the virtual bonus from every learning team member. The system automatically restores the virtual bonus to the learning team. In this way, the educator rewards learners for doing assigned work and rewards the tutors for helping the learners.

18 Claims, 1 Drawing Sheet

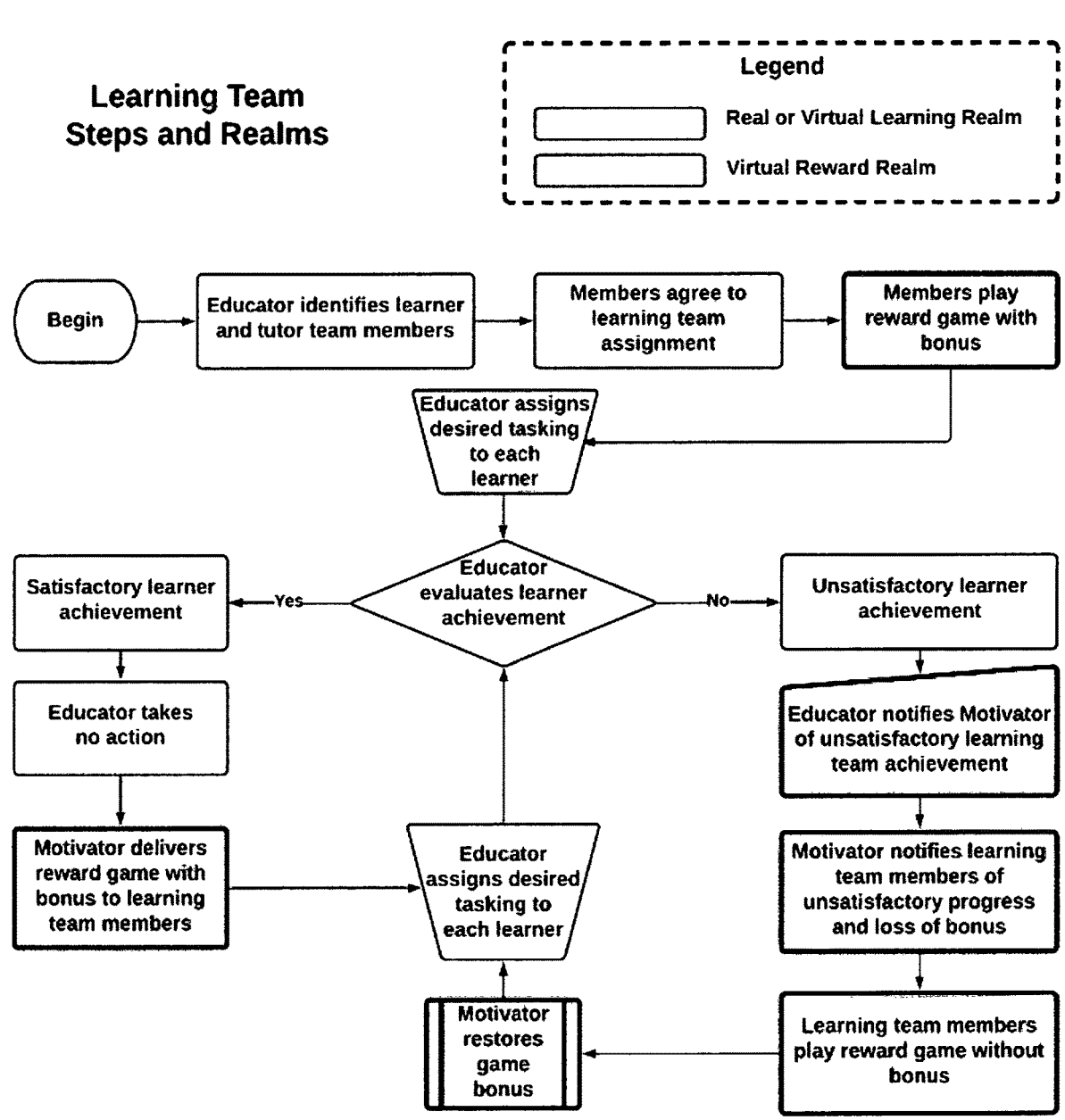

MOTIVATOR: AN ONLINE MOTIVATION SYSTEM FOR LEARNING TEAMS

SUMMARY OF THE INVENTION, THE MOTIVATOR

Purpose

The Motivator uses a multi-player strategy game to reward an adolescent learner for achievement in an attachable curriculum. The Motivator also updates and rewards the members of a supporting learning team according to recent achievement by the learner. The educator, a sponsor of this service, measures learner achievement and removes the reward from the learning team when greater learner effort is needed.

Curriculum

The sponsoring educator can attach any desired curriculum to the Motivator. The curriculum need not be online. For example, a learner might be required to pass a weekly paper-based Algebra quiz or to write five journal entries per week. Satisfactory performance earns a carrot, which is bonus ability in the game. Unsatisfactory learner progress outside of the game brings a stick, the loss of bonus ability in the game for the entire learning team.

Game

The Motivator is powered by a turn based online long term multi-player strategy game called Strong and Honored. Each player controls a tribe in a world of many tribes. Players can input their daily game decisions in less than five minutes. They must wait until the next turn to receive the results of player conflict, cooperation and luck in relation to the other players. Player decisions direct the tribe's economy, force, technology, espionage and treasure. Players can attempt to conquer or collaborate with others. Game phases repeat every three turns. Game functions operate by means of calculations and comparisons of account values. The tribe that accumulates the most treasure wins. Games played with daily turns last approximately five weeks.

BRIEF DESCRIPTION OF THE SEVERAL VIEWS OF THE DRAWING

No drawing is attached. A drawing is not needed to understand the invention.

DETAILED DESCRIPTION OF THE INVENTION

An Example Scenario: Algebra Remediation Using the Motivator

Registration

Learner is failing Algebra. Educator registers Learner along with high performing Peer Tutor as online members of a Motivator learning team. Educator registers Mother to receive learning team email updates and Father to play as an ally with the learning team in the virtual realm.

First Week

Learner, Peer Tutor and Father receive several games of free practice to teach themselves how to play using the virtual reward. In these one-hour online party games, robots challenge the human novices. Father practices on his laptop at home. Learner and Peer Tutor use cell phones to play party games together at home with some other friends. Players grow accustomed to playing with the bonus, which cannot be lost in these party training games.

Second Week

Learner, Peer Tutor and Father begin daily play in the virtual realm on Monday. They are in the same operational online game in which the whole team can gain or lose the bonus together. Learner passes Educator's assigned quiz. Educator does not need to update the Motivator bonus status. By default, the system gives the bonus for Learner, Peer Tutor and Father in their virtual game play. Learner receives appreciation by teammates for his work.

Third Week

Learner fails Educator's quiz on Thursday and Educator taps the bonus removal button. Peer Tutor and Father automatically lose the virtual game bonus along with Learner. Mother also receives an email notice that Learner has not made satisfactory Algebra progress. Three people Learner cares about speak with him about giving better effort.

Fourth Week

Peer Tutor is bothered by the loss of the virtual game bonus and gains agreement by Learner to practice together. Learner passes the quiz, so Educator takes no virtual action. The Motivator automatically provides the bonus for all three learning team players, giving them more power in the virtual realm.

Fifth Week

Learner continues to give diligent effort and gains success in Algebra. Learning team members continue to receive the daily virtual reward and give appreciation to Learner for the achievement.

Recognition

On Friday, Educator posts a printout of the classroom Motivator report of top players in the virtual realm. Learner and Peer Tutor see their names and enjoy the affirmation. Mother and Father read emails declaring that Learner is in the top half of the player rank in his virtual game.

Shared Carrot for the Team

When the learner achieves satisfactory curriculum progress, the educator takes no action. The system rewards the entire learning team by default. The learning team consists of students and adults the learner knows. No school staff members are needed. The members of the learning team all gain spies and stronger leaders in their separate tribe experiences. These benefits are called the game bonus. In this way, the learner and the tutor receive positive feedback in game play and in their relationships with team members.

Shared Stick for the Team

When the learner fails to demonstrate assigned goal accomplishment, the sponsoring educator removes the bonus. The resulting penalty status weakens the leaders and prevents espionage for the tribe of the learner and the tribes of every member of the learning team. The Motivator penalty status reminds the learner and the learning team for three game turns of the learner's need for added effort. The learning team members are likely to give additional attention in their educational relationships with the learner. The Motivator app automatically restores the bonus to all learning team members after three turns.

Learning Teams

These are some of the learning team configurations that can be employed.

| | | |
|---|---|---|
| LL | 2 students | Learner-Learner |
| LP | 1 student, 1 adult | Learner-Parent |
| LTP | 2 students, 1 adult | Learner-Tutor-Parent |
| LTPO | 2 students, 2 adults | Learner-Tutor-Parent-Other Adult |

In every learning team configuration, the learner and team members know one another. An educator enrolling the learner need not recruit staff to perform support functions. Learner support is performed within the student's own web of relationships at the prompting of the automated system. The support members and game players are notified and sanctioned when the learner fails to make progress.

Support

The learning team performs tutoring, celebration and accountability functions for the learner. Tutoring by a student provides the skills needed by the learner. Tutoring by the teacher is not required. The entire learning team celebrates learner progress when they receive bonus status in the game. An adult may choose not to play the game. In that case, the system keeps the adult informed of the learner's curriculum progress. Learning team members are all informed when the educator chooses to withhold the bonus. That prompts the team members to hold the learner accountable.

Employment

The system may be employed by the sponsoring educator inside or outside of the classroom, before, during or after school, by means of any variety of personal or organic online devices.

Recognition

The sponsoring educator appoints a herald to recognize game prowess by the players every week. The Motivator issues a list of top players in the educator's sponsored games on a selected day each week. The herald or teacher announces to these players, "You are strong and honored." Alternatively, a printout can be posted to recognize players by name.

Effect

A sponsoring educator who employs the Motivator app is not only rewarding the learner for doing the assigned work. The sponsor is also rewarding the peer tutor for helping the learner succeed. A qualified peer tutor can provide instruction as well as encouragement. The Motivator can thereby help a sponsoring educator leverage learner and peer tutor success without investing significant instruction time. The learner and peer tutor can both gain curriculum achievement, fun in the game, satisfaction in relationships, and public recognition for their participation in the Motivator.

Strong and Honored: The Game that Powers the Motivator

This is a description of a basic daily version. Other versions are planned.

Day 1 Production & Agents (Mondays and Thursdays)
Display to players: Accurate intelligence; invasion results; honor standings score; notifications and messages; end of game?
Input from player: Choose three production options of force, art, and business; choose three imperial production options of force and art; assign four agents; list relief beneficiaries; call for wolf pack; create a tax union; send messages Day 2 Leaders & Gifts (Tuesdays and Fridays)
Display to players: Manipulated intelligence; notifications and messages
Input from player: Select and deploy two leaders; give force, art, treasure and technology; assign four raid commanders; send messages Day 3 War & Chance (Wednesdays and Weekends)
Display to players: Technology advance; art added to treasure; last known intelligence; raid results; recon results
Input from player: Assign four officers to invasion, ally defense, or home defense; assign four imperial officers to invasion, ally defense, or home defense; send messages Winning Players win by accumulating honor stars, based on treasure ranking. They may produce their own art, which becomes treasure, or they may loot the treasure of conquered victims. In many classroom games played by students since the late 1980s, the top treasure award was always won by a peaceful tribe. Players establish favorable relationships by means of generosity and reliability.

Initial Values

Tribes begin the game with the same initial values.
4 economy points
stone age technology, multiple 1
4 adults
4 babies
4 force points
4 espionage points
4 security points
0 art points
4 treasure points World Map This is an example arrangement for a smaller game with 24 players. Larger games are envisioned. Tribes are arranged in groups of three on eight islands. The three tribes begin the game with each other in the Stone Age and at first have no contact with other tribes. A three-tribe arrangement intentionally creates rivalries due to unbalanced forces.

| Home Island A | Tribes 1, 2, 3 | This is the location of the learner's tribe. |
| Near Island B | Tribes 4, 5, 6 | |

(Separation)

| Far Island C | Tribes 7, 8, 9 | This is the location of the peer tutor's tribe. |
| Far Island D | Tribes 10, 11, 12 | |

(Large Separation)

| Remote Island E | Tribes 13, 14, 15 | This is the location of the parent's tribe. |
| Remote Island F | Tribes 16, 17, 18 | |

(Separation)

| Remote Island G | Tribes 19,20,21 | |
| Remote Island H | Tribes 22,23,24 | This is the far side of the world. |

Formulas

These are the relationships used to compute account values for each tribe.
adults times technology level=economy
babies times technology level=future economy
present era adults=initial present era babies
production B=babies times 2
production BB=babies times 4
production BBB=babies times 8
present era babies=next era adults
babies times technology level=future economy
economy=force (fighting strength)
production F=force times 2
production FF=force times 4
production FFF=force times 8
art=0 (no tribes make art unless they choose A)

production A=economy value of art
production AA=economy value of art times 2
production AAA=economy value of art times 3
art=new treasure after Day 2
old treasure+new treasure=total treasure on Day 3
each agent wields truth points=¼ of the tribe's economy
each commander wields security points=¼ of the tribe's economy
each officer wields force points=¼ of the tribe's force
artist leader=economy value of art
warrior leader=force times 2
scout leader=4 additional agents
scientist leader=½ technology advance
ninja leader=removal of two neighbor leaders
guard leader=removal of every approaching ninja Prevention of Bullying The two, three or more players on a learning team know each other and receive system messages of encouragement to care for each other. Their identities are hidden from other teams to prevent bullying. Unacquainted players are intentionally assembled from distant locations to maintain anonymity outside of the learning teams. The Motivator gives no opportunity to present or exchange personal information. It conceals the actual game number and tribe numbers. Players are told that they control Tribe 1, Tribe 7, or Tribe 13. Their tribe numbers in the master game may actually be 5, 11, and 17. In this way players have little information by which to determine the identity or even the state of residence of fellow game players. Bullying is impossible when the players do not know each other. The Motivator also prevents tribes on the same team from harming each other.

In-Game Communication

Players may select and send up to two canned messages to neighbor tribes every day. No free form messages are allowed. The messages are previously prepared to ensure appropriate content and to prevent players from wasting time. Learning team members are expected to speak to each other about strategies and game situations. The learning team tribes are uniquely positioned for the players to personally share intelligence from their remote regions. This builds interdependence among the learning team members.

Game Play Specifics

Day 1 Production

Players direct their tribes to grow their economy, create treasure or produce force. Three options allow ten combinations. For example, production combination FAB chooses one force option, one art option, and one business option. Production combination BBA is two business options and one art option. BBA and ABB are identical in function.

Day 1 Intelligence

Accurate neighbor data is revealed to all players within technology range. All tribes begin play in the Stone Age, capable of seeing the data of only two other tribes. With increased technology later in the game, the player can eventually see the data and be a neighbor of all the other 23 tribes in the game.

Day 1 Empires

Tribes that conquered another tribe on the previous day receive tribute from that subject tribe. Tribute consists of one half of the subject tribe's normal economy. The empire directs production using three options of art and/or force. There are four combinations. Each art option adds a tribute economy value of art points. No business production by empires is allowed.

Day 1 Bonus Agents

Bonus players place their tribe's four agents at up to four neighbor locations, including their home location. Agent truth strength is based on the strength of their economy. Truth point totals at a contested location are compared and the prevailing tribe receives accurate intelligence data. Furthermore, the prevailing tribe establishes the truth version of their choice at that location. This truth choice is offered for consumption by other players on Day 2.

These are the three truth versions. Transparency gives accurate information to the neighbors. Decoy deception appears to halve the actual force and add to the actual art of neighbors on the enemy list. The decoy gives the appearance of high potential loot that is weakly defended. Cloak deception appears to double the actual force and halve the actual art of the home tribe and neighbors on the ally list. Cloaking causes a tribe to appear less attractive and more strongly defended.

Day 1 Call for Wolf Pack

On Day 1, every tribe may designate an enemy for wolf pack attack by other tribes by placing an icon by the target tribe. Players are thereby encouraged to make raid orders by their terror commanders on Day 2, the next day. Wolf pack attacks provide game balance by checking the growth of superpower tribes. The icon reveals the identity of the conspiring tribe.

Day 1 Tax Union

On Day 1, a free tribe may pay a tax of one force production option to a neighbor tribe, thereby increasing the force of the recipient tribe. This creates a tax union. The tax recipient tribe becomes the governor of the union and assumes responsibility for defense of the entire new political entity. Ties are broken by die roll. The governor may not decline this responsibility. An invasion of any tribe in this union is opposed by the governor's force. The governor is free to use the force to conquer union members.

Day 2 Intelligence Data

On Day 2, players receive updated data. Production options chosen on Day 1 significantly alter the previous intelligence data. Truth agents for bonus players may further manipulate that information. The system never affirms validity of intelligence data reported by agents. No player can be sure their information is accurate until the next unmanipulated Day 1 intelligence report.

Day 2 Leaders

Every player selects two leader types on Day 2. Diligent leaders are entirely reliable, never failing to perform their function. Bonus status affects the lazy leader success rate. For bonus players, lazy leaders are 67% reliable. Lazy leaders for penalty players succeed only 33% of the time.

Day 2 Leader Types

Players gain benefits for their tribe by selecting two leaders. These are the six leader types from whom they may choose. Unsuccessful lazy leaders, disqualified by a die roll, have no effect. A successful Artist Leader creates an economy value of art. A successful Warrior Leader doubles the tribe's force. A successful Scout Leader creates four additional agents who try to break through the Day 3 fog of war in order to gather accurate pre-battle intelligence. A successful Scientist Leader discovers one third of a technology advance. A successful Ninja Leader removes a random leader of two targeted tribes. A successful Guard Leader removes all approaching Ninja Leaders.

Day 2 Scout Leader Agents

The player assigns the Scout Leader's four additional agents at up to four neighbor tribe locations. The previously placed agents may not relocate. The new scout work provides an updated pre-battle report on Day 3 in an attempt to break through the fog of war. The pre-battle update by the four recon agents may or may not be accurate.

Day 2 Raids

Each tribe has four security commanders whose strength depends on the tribe's economy. The commanders provide security against foreign raids. Players may reassign the four commanders to raid and terrorize up to four neighbor tribes. Each raiding commander weakens the home security mission by abandoning the default defense position to outside raiders. Public raids exert full terror strength. Secret raids apply half terror strength.

Raids are resolved by first adding all the raid points together at each target tribe location. This wolf pack function is in contrast to the Day 3 procedure where invading forces of different tribes do not combine. Wolf packs enable weaker adversaries to unite against a superior foe. Tax unions are ignored. If the wolf pack strength exceeds the target tribe's home security value, the victim suffers one terror roll, effective immediately.

Terror Roll Table

| Die Roll | Destruction |
|---|---|
| 1 | Victim baby value is halved. |
| 2 | Victim technology multiple is reduced. |
| 3 | Victim force value is halved. |
| 4 | Victim treasure value is halved. |
| 5 | Victim art value is halved. |
| 6 | Victim loses one discovery. |

Day 2 Discoveries

A Scientist Leader discovers one third of a technology advance. When three foreign and/or domestic discoveries are added together, the tribe advances in technology. A terror result may cancel one discovery. Technology advance is a big deal for players. The dramatic rise in strength and range is immediately implemented for use under cover of the fog of war on the next day.

Technology Advance

The technology multiplier achieved by technology breakthrough is made to match the existing top technology within the hemisphere. A low technology tribe may jump two or more technology ages. If the tribe breaking through already had top tech, they advance to the next higher age. The economy and range immediately expand according to the technology table. Economic advance instantly boosts the force, art, future business, and range values. These changes are revealed to the controlling player on Day 3. The changes are accurately disclosed to neighboring players on the following turn, Day 1.

Technology Table

| Technology Age | Multiplier | Full Strength | Half Strength at long range |
|---|---|---|---|
| Stone | 1 | Border | Home Island |
| Bronze | 2 | Home Island | Near Island |
| Iron | 4 | Home Island | Near Island |
| Gunpowder | 8 | Home Island | Global |
| Steam | 16 | Near Island | Global |
| Electrical | 32 | Near Island | Global |
| Nuclear | 64 | Near Island | Global |
| Space | 128 | Far Island | Global |
| Information | 256 | Far Island | Global |
| Drone | 512 | Far Island | Global |
| Fusion | 1024 | Global | Not Applicable |
| Warp | 2048 | Global | Not Applicable |

Day 2 Gifts

Players may give a variety gifts to one tribe or to several different neighbor tribes. Gifting is not required but tends to create trust in the recipient. These are the choices. 1) Give half of the tribe's force to one tribe. 2) Give half of the tribe's art to one tribe. 3) Give half of the tribe's treasure to one tribe. 4) Give a discovery by a current scientist to one tribe.

The transactions are revealed on Day 3 to the involved players but not to others.

Day 3 Chance

Each tribe will be helped or harmed according to the results of one die roll. War orders will be executed after chance results. Players will not see the chance results until the next turn.

Chance Table

| Roll | Result | Effect |
|---|---|---|
| 1 | Disunity | Internal conflicts halve the tribe's economy in the coming era. |
| 2 | Disaster | Half of the tribe's treasure is destroyed. |
| 3 | Sickness | The tribe's force is halved. |
| 4 | Health | The tribe's force doubles. |
| 5 | Prosperity | The value of the tribe's treasure doubles. |
| 6 | Unity | Collaboration doubles the tribe's economy in the coming era. |

Day 3 Fog of War

Player choices of leaders and gifts during Day 2 are not revealed to neighbors on Day 3. The intelligence data is not updated. This lack of information creates a fog of war, an uncertainty among players about the actions and capabilities by others. Raid results are revealed to neighbor tribes on Day 3, which may stir some players to invade weakened tribes before they can recover. Scouts agents report unreliable data for tribes chosen on the previous turn.

Day 3 War Orders

A tribe's force is based on their economy. The force of each tribe is divided into four force quarters, each of which is commanded by an officer. The officers may be ordered to defend the home tribe against invaders, to protect an ally neighbor, or to invade a neighbor tribe. Force deployed at long range is reduced to half strength.

Day 3 Imperial War Orders

For empires with tribute force, the player deploys those four imperial officers to four home or neighbor locations. The imperial officers may be ordered to defend the home tribe against invaders, to protect an ally neighbor, to re-conquer the subject tribe or to invade another neighbor tribe. Tribes that are not re-conquered gain their freedom. Force deployed at long range is reduced to half strength.

Day 3 Officer Bonus

Officers are 100% effective when the controlling player has the bonus. When the player is in penalty, each of the four or eight officers is subject to failure 17% of the time. Failure means the officer's force value is zero.

Day 3 Invasions

After the chance roll is applied, invasion strength is compared to defense value at each tribe location. Invasion forces by different tribes are not added together. When the force by an invader exceeds the defense value, the victim is conquered. Ties go to the defender.

Conquest

When invasion succeeds, these conquest results are applied. These results do not apply if invasion fails. Conquest establishes an empire for the invading tribe. The conqueror crushes the victim economy. The conqueror usurps higher victim technology. The conqueror loots victim treasure. The conqueror extracts economic tribute in the next era.

Conquest crushes the victim economy to half strength. The conqueror gains the victim's technology, if it is superior. Upon conquest, two rolls are employed to determine the treasure disposition. One roll on the looting table below disposes of half of the conquered tribe's treasure. A second roll disposes of the second half of the victim's treasure. No art remains since art was added to previous treasure after Day 2. The conquered tribe will pay half of their economy as tribute to the empire on Day 1 the next day. The empire may employ the tribute to produce art or to produce force by which to expand the empire.

| Looting Table for Half of the Treasure Roll twice. | | |
| --- | --- | --- |
| Roll | Result | Explanation |
| 1 | Looted | The conqueror robs this half of the treasure. |
| 2 | Looted | The conqueror robs this half of the treasure. |
| 3 | Burned | This half of the treasure is destroyed. |
| 4 | Burned | This half of the treasure is destroyed. |
| 5 | Hidden | The victims hide and retain this half of the treasure. |
| 6 | Hidden | The victims hide and retain this half of the treasure. |

Game End

Players must guess when the game will end. This prevents mayhem in the final era. During some era after Era 8, after at least four weeks of game play, the game will end randomly. The game conclusion will be announced on the following Day 1.

| Secret Game End Table | |
| --- | --- |
| Era 1-7 | 0% probability of game end |
| Era 8, after four weeks | 10% probability of game end |
| Era 9, after 4½ weeks | 20% probability of game end |
| Era 10, after five weeks | 40% probability of game end |
| Era 11, after 5½ weeks | 60% probability of game end |
| Era 12, and beyond | 80% probability of game end |

Player Reassignment

Member replacement in a learning team is allowed at any time. At the end of a game, play resumes immediately on Day 1 in a new game following notification of the conclusion of the previous game. No action is required by the sponsoring educator in order to continue the motivation service. The Motivator assembles top learner players ranked in the upper 50% in new games against other top players. Tutor and adult team members are assigned in the same game with the learner, so the learning team stays together. Learner players ranked in the lower 50% are assembled in games with novice players.

Time Considerations

An experienced Strong and Honored player needs less than five minutes per day to plan and click or tap on their choices. The system can time the players out after ten minutes. After players click on their choices, they must wait until the next turn to see the updates and make their new selections. Limited game time each day builds a healthy study habit rather than a fruitless addiction. The game may be employed inside or outside of the classroom before, during or after school, by means of whatever devices the participants may choose.

Moral Values

Game players initially expect that conquest will be so effective that invaders will tend to win. In actual game results, peaceful tribes excel. This creates cognitive dissonance among players, who may rethink the desirability of honesty, generosity and respect in their own real-life relationships. Game results build moral values.

Rapid Rise or Fall

Relative tribe positions change rapidly due to player choices and chance. Values for populations, economies, raider strengths and fighting forces can jump or plunge exponentially. Relative economic gaps quickly develop and discourage players of weak tribes. The Motivator solves this problem by mandating BBB production by weak tribes and disallowing BBB by the strongest tribes. This solution keeps all the tribes competitive.

The invention claimed is:

1. An online method of motivating a student, the method comprising:
   receiving a team indication at an online system, wherein the team indication indicates that a plurality of game players form a team of game players for one or more online games,
   wherein at least one of the game players is a student in an assessable education process having an education topic;
   receiving, at the online system, game inputs from the game players, wherein the game inputs communicate decisions made by the game players, and wherein the decisions are related to the game players playing the online game;
   transmitting, with the online system, game functions corresponding with the online game and corresponding with the received game inputs from the game players, wherein the game functions demonstrate one or more increasable and decreasable game abilities for the game players;
   receiving an assessment indication at the online system, wherein the assessment indication indicates that the student has participated in an education assessment related to the education topic, and wherein the education assessment is at least partly unrelated to the online game;
   in response to receiving the assessment indication, with the online system, increasing at least one of the increasable and decreasable game abilities for each of the game players of the team of game players;
   receiving, at the online system, an additional game input from a particular game player, wherein the additional game input is related to the increased at least one increasable and decreasable game ability;
   transmitting, with the online system, an additional game function corresponding with the online game and corresponding with the received additional game input from the particular game player, wherein the additional game function demonstrates the increased at least one increasable and decreasable game ability for the particular game player, and wherein the particular game player is advantaged in the online game because of the increased at least one increasable and decreasable game ability;
   receiving a deficiency indication at the online system, wherein the deficiency indication indicates that the student's participation in the education assessment has failed to meet a performance threshold;
   in response to receiving the deficiency indication, with the online system, not increasing the at least one increasable and decreasable game abilities for each of the game players of the team of game players;

receiving, at the online system, another game input from a first game player, wherein the other game input is related to the unincreased at least one increasable and decreasable game ability; and transmitting, with the online system, another game function corresponding with the online game and corresponding with the received other game input from the first game player, wherein the other game function demonstrates the unincreased at least one increasable and decreasable game ability for the first game player, and wherein the first game player is not advantaged in the online game because of the unincreased at least one increasable and decreasable game ability, wherein the deficiency indication is generated in response to an input to the online system.

2. The method of claim 1, further comprising:

in response to receiving the deficiency indication, with the online system, decreasing the at least one increasable and decreasable game abilities for each of the game players of the team of game players;

receiving, at the online system, another game input from a first game player, wherein the other game input is related to the decreased at least one increasable and decreasable game ability; and transmitting, with the online system, another game function corresponding with the online game and corresponding with the received other game input from the first game player, wherein the other game function demonstrates the decreased at least one increasable and decreasable game ability for the first game player, and wherein the first game player is disadvantaged in the online game because of the decreased at least one increasable and decreasable game ability.

3. The method of claim 2, further comprising, after decreasing the at least one increasable and decreasable game abilities for each of the game players, automatically increasing the at least one increasable and decreasable game abilities for each of the game players.

4. The method of claim 1, wherein at least one of the game players is not a student subject to the education assessment of the assessable education process.

5. The method of claim 1, wherein at least one of the game players is a family member of the student.

6. The method of claim 1, wherein the education assessment comprises a performance assessment related to the assessable education process.

7. The method of claim 1, wherein the assessment indication is generated without input from education staff.

8. An online system, configured to:

receive a team indication, wherein the team indication indicates that a plurality of game players form a team of game players for an online game, wherein at least one of the game players is a student in an assessable education process having an education topic;

receive game inputs from the game players, wherein the game inputs communicate decisions made by the game players, and wherein the decisions are related to the game players playing the online game;

transmit game functions corresponding with the online game and corresponding with the received game inputs from the game players, wherein the game functions demonstrate one or more increasable and decreasable game abilities for the game players;

receive an assessment indication at the online system, wherein the assessment indication indicates that the student has participated in an education assessment related to the assessable education process, and wherein the education assessment is at least partly unrelated to the online game;

in response to receiving the assessment indication, increase at least one of the increasable and decreasable game abilities for each of the game players of the team of game players;

receive an additional game input from a particular game player, wherein the additional game input is related to the increased at least one increasable and decreasable game ability;

transmit an additional game function corresponding with the online game and corresponding with the received additional game input from the particular game player, wherein the additional game function demonstrates the increased at least one increasable and decreasable game ability for the particular game player, and wherein the particular game player is advantaged in the online game because of the increased at least one increasable and decreasable game ability;

receive a deficiency indication at the online system, wherein the deficiency indication indicates that the student's participation in the education assessment has failed to meet a performance threshold;

in response to receiving the deficiency indication, not increase the at least one increasable and decreasable game abilities for each of the game players of the team of game players;

receive another game input from a first game player, wherein the other game input is related to the unincreased at least one increasable and decreasable game ability; and transmit another game function corresponding with the online game and corresponding with the received other game input from the first game player, wherein the other game function demonstrates the unincreased at least one increasable and decreasable game ability for the first game player, and wherein the first game player is not advantaged in the online game because of the unincreased at least one increasable and decreasable game ability, wherein the deficiency indication is generated in response to an input to the online system.

9. The system of claim 8, further configured to: in response to the deficiency indication, decrease the at least one increasable and decreasable game abilities for each of the game players of the team of game players;

receive another game input from a first game player, wherein the other game input is related to the decreased at least one increasable and decreasable game ability; and transmit another game function corresponding with the online game and corresponding with the received other game input from the first game player, wherein the other game function demonstrates the decreased at least one increasable and decreasable game ability for the first game player, and wherein the first game player is disadvantaged in the online game because of the decreased at least one increasable and decreasable game ability.

10. The system of claim 9, further configured to, after decreasing the at least one increasable and decreasable game abilities for each of the game players, automatically increase the at least one increasable and decreasable game abilities for each of the game players.

11. The system of claim 8, wherein at least one of the game players is not a student subject to the education assessment in the assessable education process.

12. The system of claim 8, wherein at least one of the game players is a family member of the student.

13. The system of claim 8, wherein the education assessment comprises a performance assessment related to the assessable education process.

14. The system of claim 8, wherein the assessment indication is generated without input from education staff.

15. An online method of motivating a student, the method comprising:
- receiving a team indication at an online system, wherein the team indication indicates that a plurality of game players form a team of game players for an online game, wherein at least one of the game players is a student in an assessable education process having an education topic;
- receiving, at the online system, game inputs from the game players, wherein the game inputs communicate decisions made by the game players, and wherein the decisions are related to the game players playing the online game;
- transmitting, with the online system, game functions corresponding with the online game and corresponding with the received game inputs from the game players, wherein the game functions demonstrate one or more increasable and decreasable game abilities for the game players;
- receiving a deficiency indication at the online system, wherein the deficiency indication indicates that the student's participation in the education assessment has failed to meet a performance threshold;
- in response to receiving the deficiency indication, with the online system, decreasing the at least one increasable and decreasable game abilities for each of the game players of the team of game players;
- receiving, at the online system, another game input from a first game player, wherein the other game input is related to the decreased at least one increasable and decreasable game ability; and
- transmitting, with the online system, another game function corresponding with the online game and corresponding with the received other game input from the first game player, wherein the other game function demonstrates the decreased at least one increasable and decreasable game ability for the first game player, and wherein the first game player is disadvantaged in the online game because of the decreased at least one increasable and decreasable game ability,
- wherein the deficiency indication is generated in response to an input to the online system.

16. The method of claim 15, further comprising, after decreasing the at least one increasable and decreasable game abilities for each of the game players, automatically increasing the at least one increasable and decreasable game abilities for each of the game players.

17. The method of claim 15, wherein at least one of the game players is not a student subject to the education assessment in the assessable education process.

18. The method of claim 15, wherein the education assessment comprises a performance assessment related to the assessable education process.

* * * * *